No. 820,265. PATENTED MAY 8, 1906.
T. W. SLUTZ & K. O. LEE.
GRAIN SEPARATOR.
APPLICATION FILED APR. 10, 1905.
3 SHEETS—SHEET 3.
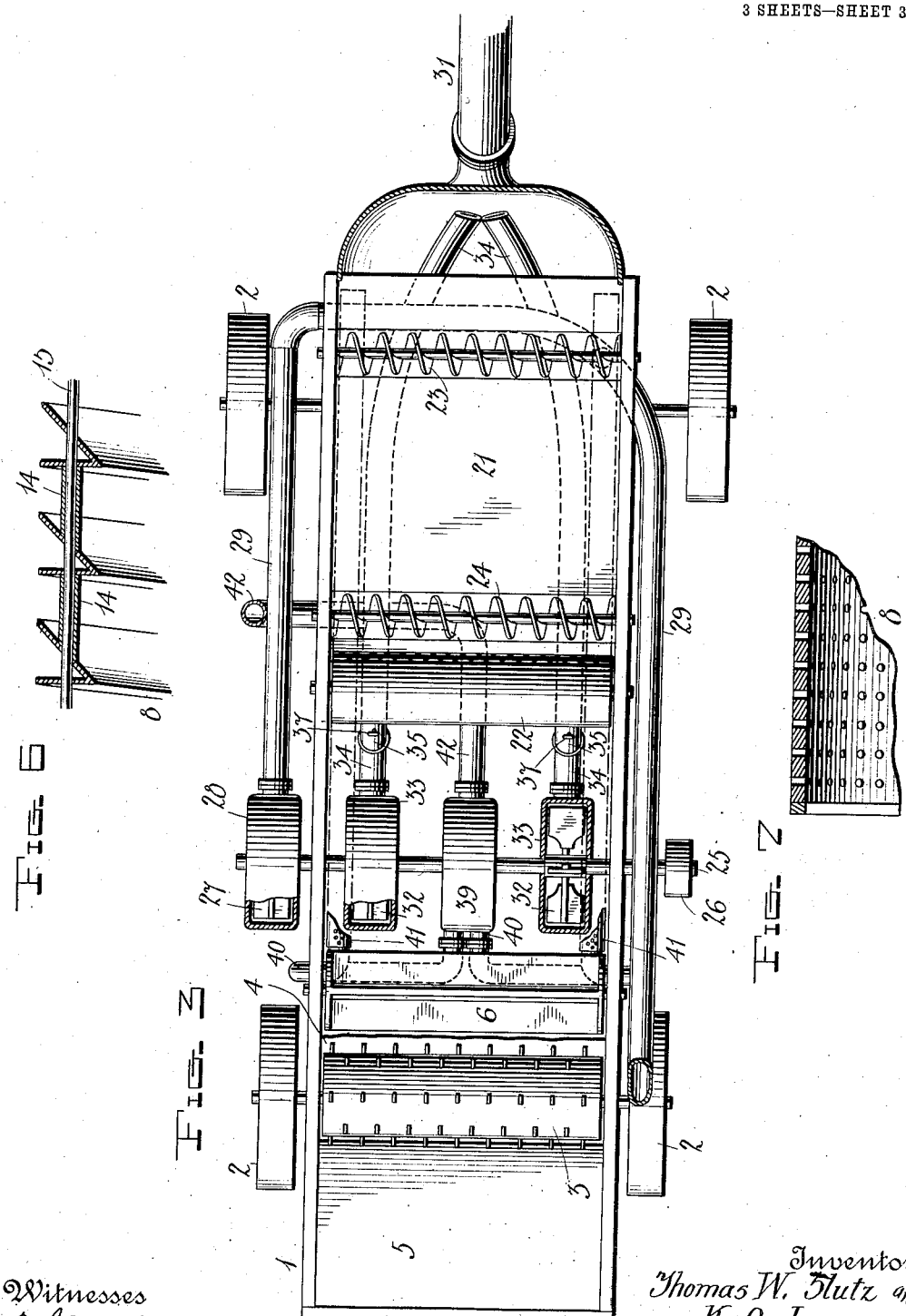
Witnesses
Inventors
Thomas W. Slutz and
K. O. Lee
by
Attorney

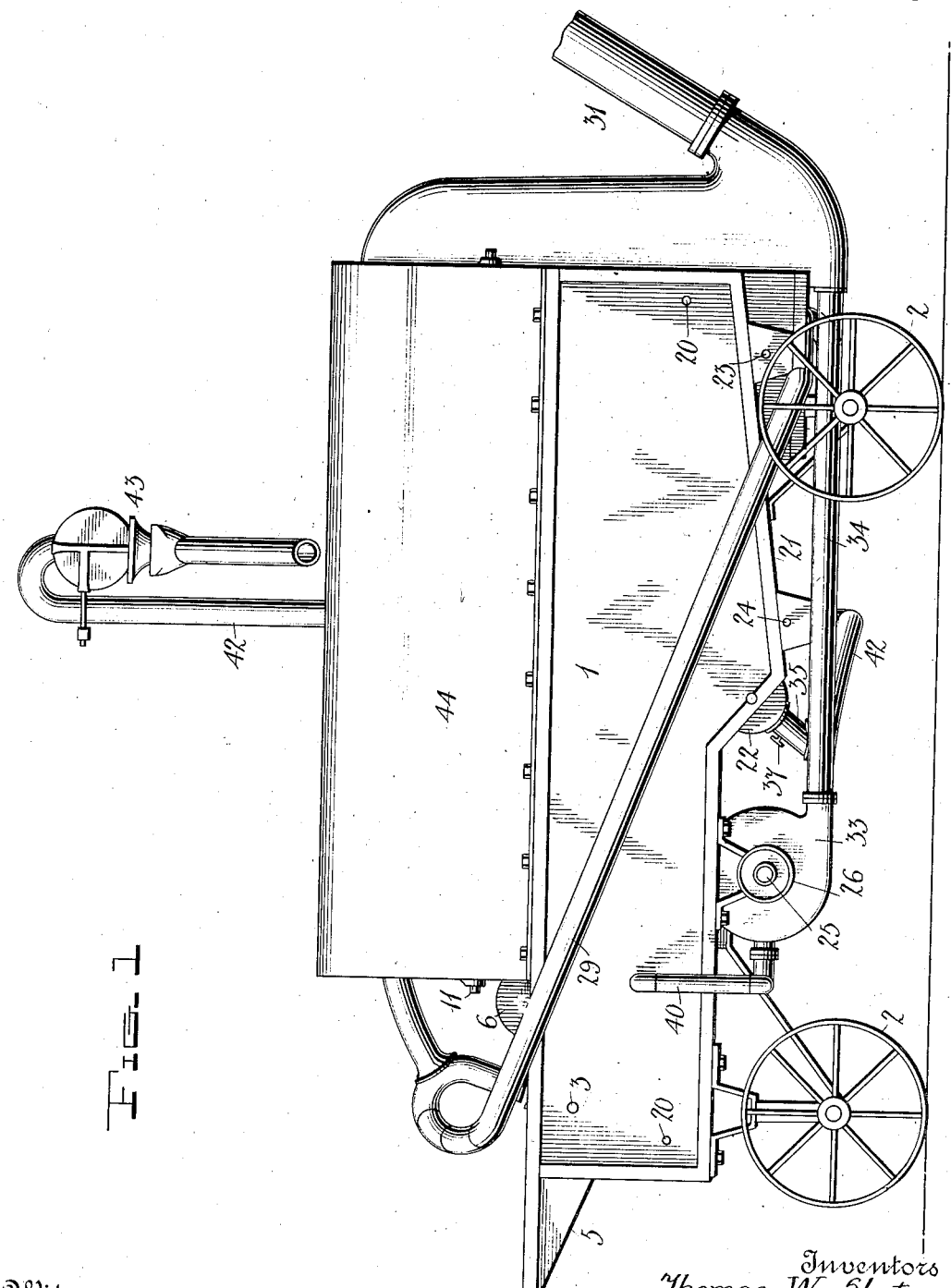

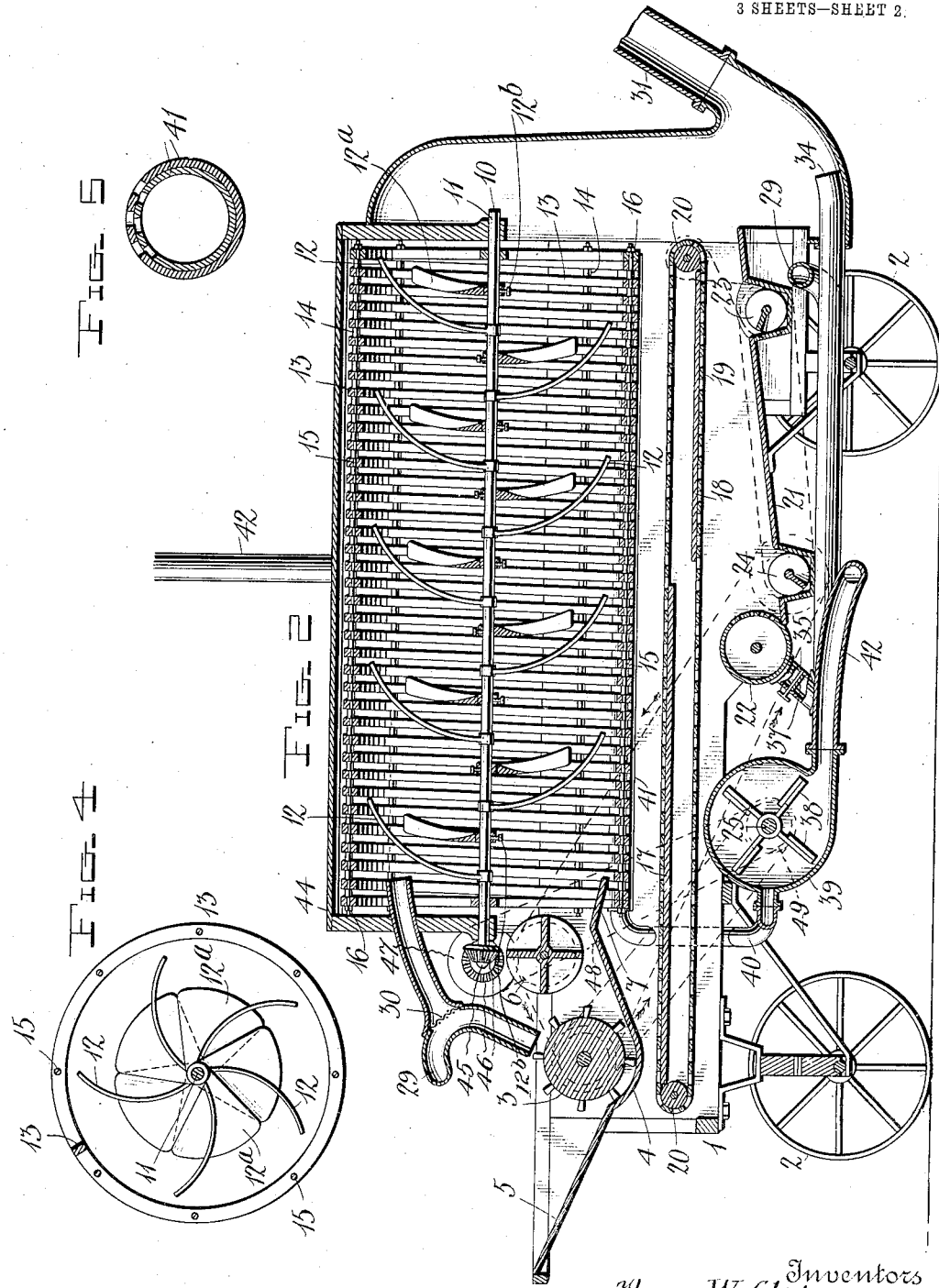

UNITED STATES PATENT OFFICE.

THOMAS W. SLUTZ AND KNUTE O. LEE, OF ABERDEEN, SOUTH DAKOTA.

GRAIN-SEPARATOR.

No. 820,265.                Specification of Letters Patent.            Patented May 8, 1906.

Application filed April 10, 1905. Serial No. 254,803.

*To all whom it may concern:*

Be it known that we, THOMAS W. SLUTZ and KNUTE O. LEE, citizens of the United States, residing at Aberdeen, in the county of Brown and State of South Dakota, have invented certain new and useful Improvements in Grain-Separators; and we do declare the following to be a full, clear, and exact description of the invention, such as will enable others skilled in the art to which it appertains to make and use the same.

This invention relates to improvements in threshing-machines and separators.

The object of the invention is to provide a threshing-machine having connected thereto a separating mechanism, whereby the grain or seed of any kind will be separated from the straw or grass and thoroughly cleaned.

A further object is to improve and simplify the construction and arrangement of machines of this character, whereby the same will be efficient and reliable in operation and less expensive to manufacture.

With the above and other objects in view the invention consists of certain novel features of construction, combination, and arrangement of parts, as will be hereinafter described and claimed.

In the accompanying drawings, Figure 1 is a side elevation of the threshing-machine and separator. Fig. 2 is a vertical longitudinal sectional view of the threshing-machine and separator constructed in accordance with the invention. Fig. 3 is a horizontal sectional view showing the arrangement of the air-blast fans and tubes, parts being broken away to more clearly illustrate the construction and arrangement of the same. Fig. 4 is a vertical sectional view of the separator-drum, showing the arrangement of the beating and feeding arms and the segmental stop-plates. Fig. 5 is an enlarged detail cross-sectional view through one of the double perforated air-blast tubes, illustrating the manner in which the same may be adjusted to vary the size of the aperture formed therein; and Figs. 6 and 7 are detail fragmentary sectional views showing modified constructions of the separating-drum.

Referring more particularly to the drawings, 1 denotes the frame of the machine, which may be of any suitable construction and is provided with supporting-wheels 2. On the forward end of the frame 1 is arranged the usual spiked threshing-cylinder 3, which coacts with the usual concave 4, located beneath the same and into which grain to be threshed is fed from the usual feeding board or table 5. The grain after leaving the threshing-cylinder 3 passes between the usual rotary beater 6 and the rear inclined portion 7 of the concave 4 and is thereby directed into a perforated non-revoluble separator-drum 8. This drum 8 extends longitudinally in a horizontal plane, and the grain is fed therethrough by means of a rotary beater 6 and feeder 10. The latter comprises a shaft 11, on which is concentrically mounted the drum 8, said shaft being provided at intervals along its length with curved laterally-projecting beating and feeding arms 12, which as the shaft revolves will throw the straw and chaff against the sides of the cylinder, thus thoroughly agitating the same and separating the grain and seed therefrom. The rotary action of the arms 12 also tends to move the straw and chaff rearwardly through the drum to the delivery end of the same, where it is discharged into a suitable stacker-tube hereinafter described. On the forward portion of the shaft 11, between the beating and feeding arms 12, is arranged a series of segmental blades $12^a$. Said blades are attached to collars which are secured to the shaft by means of set-screws $12^b$, the several blades being disposed radially around the shaft to form together a complete circle. Said blades form stops against which the flying grain will strike, thus preventing the discharge of the same from the end of the cylinder. The blades are located at such distances apart to permit the free passage of straw between them, and the number and size of the same may vary according to the size of the drum.
The drum 8 is preferably constructed from an endless strip 13 of metal, which is wound spirally and edgewise to form the cylinder or drum 8. The spirally-wound portions of the strip are provided at suitable intervals with alined apertures, and between the spirally-wound portions of the strip are arranged short sections of tubing 14, through which and the alined apertures in the strip is adapted to be passed tie bolts or rods 15, which extend throughout the entire length of the cylinder and have applied to their threaded ends nuts 16, whereby the spiral portions of the strip may be securely clamped into engagement with the tubular sections 14, thus firmly holding said spiral portions of the strip together, and held apart to form the desired discharge-spaces between the same. The spirally-wound portions of the strip 13 may be arranged in a vertical position at right angles to the length of the drum, but are preferably wound at an oblique angle thereto, as shown.

Beneath the concave 4 and the forward end of the drum 8 is arranged a table or platform 17, while beneath the rear end of the drum 8 is arranged a table or platform 18. The latter platform is spaced a short distance from the rear end of the first platform and arranged in a plane below the same. Adapted to move over the tables 17 and 18 is an endless slatted conveyer 19, said conveyer passing around rollers 20, arranged transversely in the front and rear ends of the machine, the upper stretch of the conveyer passing over the upper table 17, while the lower stretch of the conveyer runs over the lower table 18. By this arrangement the seed or grain dropping upon the table 17 will be carried rearwardly by the upper stretch of the conveyer until the same reaches the rear end of said table, where it will drop between the adjacent ends of the upper and lower tables 17 and 18. The grain falling upon the lower table 18 will be carried forwardly thereon by the lower stretch of the conveyer and swept off the forward end of said table, as will be understood.

The grain after being swept off the tables 17 and 18 by the conveyer 19 will fall upon an inclined grain-shoe 21, arranged below said tables, where it will be subjected to the blast of air from a perforated air-cylinder 22, hereinafter described, which will blow the tailings and the imperfect grain rearwardly into a tailings screw or conveyer 23, while the whole or perfect grain will drop directly into a grain conveyer-screw 24, located immediately below the space between the upper ends of the tables 17 and 18.

In order that the straw and chaff may be more thoroughly separated from the grain, a system of air or wind blast tubes is arranged, whereby drafts of air will be directed upon the grain and straw at suitable places during the threshing and separating process. The air or wind for these various tubes is supplied by means of a series of fans mounted upon a shaft 25, which is arranged below the frame of the machine immediately in rear of the front supporting-wheels, as shown. On one end of the shaft 25 adjacent to one side of the machine is secured a drive-pulley 26, while on the opposite end of the shaft is mounted a fan 27. Said fan is arranged in a suitable casing 28, to which is connected a wind or air blast tube 29, which extends rearwardly along one side of the machine and across the rear end of the same, at which point suitable connection is made between the same and the tailings-conveyer 23. The tube 29 then passes around the opposite side of the machine, then upwardly above the threshing-cylinder 3, where it turns downwardly and discharges onto said cylinder. A branch of the tube 29 extends rearwardly and opens into the forward end of the separating-cylinder 8. A suitable screen 30 is arranged between the branch tube and the main tube 29, whereby when the grain from the tailings-conveyer is forced through the tube 29 said grain will be discharged upon the cylinder 3, while the dust and dirt therein will be blown through the screen 30 and the branch tube and will be discharged directly into the cylinder and carried therethrough by the air-blast and discharged into the straw-stacker tube 31 at the end of the same.

On the shaft 25, near the side of the machine, are mounted two fans 32, around which are arranged casings 33, with which are connected wind or air blast tubes 34. These tubes 34 extend rearwardly to the rear end of the separator-cylinder 8, where they come together, and are connected with the straw-stacker tube 31 in any suitable manner, whereby a blast of air will be discharged into and through the same to carry the straw and chaff which have been discharged therein from the delivery end of the separating-cylinder through said stacker-tube, by which the same will be deposited at any desired place. With the tubes 34 are connected upwardly-projecting branch tubes 35, which are connected at their upper ends with the perforated drum 22, arranged immediately in front of the grain-shoe 21 and through which a blast of air will be directed onto the grain falling upon said shoe to separate the tailings therefrom, as hereinbefore described. Suitable dampers 37 are arranged in the branch pipes 35, whereby the force of the air-blast passing through the drum 36 may be regulated.

On the shaft 25 between the fans 32 is mounted a fan 38, around which is arranged a casing 39, with the forward end of which is connected air-blast tubes 40. These tubes 40 extend in opposite directions toward the opposite sides of the machine and open into double perforated air-tubes 41, which are arranged on each side of the machine immediately below and extending the entire length of the separating-drum 8 and from which a blast of air is directed against the under side of the cylinder or drum 8. This air-blast passes through the space formed by the spirally-wound strip forming said drum, which will materially assist in separating the grain from the straw as the same is passed through the drum. The tubes 41 are preferably formed double or one tube within another. Each of said inner and outer tubes is provided on its upper inner side with a series of discharge-apertures, said inner tube being adapted to be turned within the outer tube to bring the apertures in the two tubes into and out of alinement to open or close said apertures or to vary the size of the same, thus regulating the discharge or passage of air through the same or through the separator-cylinder 8. To the rear side of the casing 29 is connected an air-blast tube 42, which extends to a suitable grain-elevator and weigher 43.

Over the upper side of the drum or cylinder 8 is arranged a hood or semicircular casing 44, which is supported upon a suitable frame arranged on the side of the machine, as shown. The hood or casing 24 serves to catch any grain which may be thrown or blown between the spirally-wound strips forming the drum and by which said grain will be caused to drop upon the tables 17 and 18 below said cylinder.

By providing a series of air or wind blast tubes in connection with a separator, as herein described, the grain will be thoroughly cleaned and separated from the chaff and straw, the latter being conducted by said air-blast to any desired place of discharge.

Any suitable mechanism may be provided whereby motion will be imparted to the rotary beater and feeder shaft, also to the grain and tailings conveyer and to the drive-pulley on the fan-shaft. For the purpose of this specification the shaft 10 is shown connected to a shaft 45 by miter-gears 46. Said shaft 45 has a pulley 47, driven by a belt 48 from a pulley 49 on the fan-shaft 25.

In Fig. 6 is shown a modified construction of separator-drum. In this instance instead of the same being formed of a flat strip wound spirally the same is formed of a spirally-wound strip of angle or V-shaped iron. In Fig. 6 is shown another modified construction of drum. In this instance the same is shown as formed of perforated sheet metal. In each of these forms the ends of the drum will be provided with binding rings or collars, to which the side portion is attached.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described our invention, what we claim as new, and desire to secure by Letters Patent, is—

1. In a machine of the character described, the combination with a threshing mechanism, of a separating-drum having open-work sides, a revoluble shaft arranged in said drum, a series of curved feeding and beating arms projecting from said shaft, grain-tables arranged below said threshing mechanism and the separating-cylinder, an endless slatted conveyer adapted to remove the grain from said tables, a grain-shoe to receive the grain from said tables, a grain-conveyer and a tailings-conveyer arranged on said shoe, a perforated air-discharge cylinder arranged in front of said grain-shoe to discharge a blast of air over the same, a pneumatic stacker-tube arranged at the discharge end of the drum, air-blast fans mounted on the frame of the machine, and air-blast tubes connecting said fans with the stacker-tube, the discharge-cylinder of the grain-shoe, the tailings-conveyer and the separator-drum, substantially as described.

2. In a machine of the character described, the combination with a threshing mechanism, of a separating-drum having open-work sides, a revoluble shaft arranged in said drum, a series of curved feeding and beating arms projecting from said shaft, grain-tables arranged below said threshing mechanism and the separating-cylinder, an endless slatted conveyer adapted to remove the grain from said tables, a grain-shoe to receive the grain from said tables, a grain-conveyer and a tailings-conveyer arranged on said shoe, a perforated air-discharge cylinder arranged in front of said grain-shoe to discharge a blast of air over the same, a pneumatic stacker-tube arranged at the discharge end of the drum, perforated air-discharge tubes arranged beneath the separator-drum, means whereby the discharge of air from said tubes may be regulated, air-blast fans mounted on the frame of the machine, and air-blast tubes leading from the casings of said fans to the stacker-tube, the discharge-cylinder of the grain-shoe, the tails-conveyer, the air-discharge tubes for the separator-drum and to said drum, substantially as described.

3. In a machine of the character described, the combination with a threshing mechanism, of a separating-drum having open-work sides, a revoluble shaft arranged in said drum, a series of curved feeding and beating arms projecting from said shaft, grain-tables arranged below said threshing mechanism and the separating-cylinder, an endless slatted conveyer adapted to remove the grain from said tables, a grain-shoe to receive the grain from said tables, a grain-conveyer and a tailings-conveyer arranged on said shoe, a perforated air-discharge cylinder arranged in front of said grain-shoe to discharge a blast of air over the same, a pneumatic stacker-tube arranged at the discharge end of the drum, double, perforated air-tubes arranged beneath and at each side of the separator-drum, the inner member of said double tubes being adapted to be turned within the outer thereby varying the size of the discharge-openings in the same, air-blast fans mounted on said frame, air-blast tubes leading from the casings of said fans to the stacker-tube, branch pipes leading from said tubes to the discharge-cylinder of the grain-shoe, regulating-dampers arranged in said branch pipes, an air-blast tube leading from said fans to the tailings-conveyer and from thence to the threshing-cylinder, a branch pipe leading from said tube to the front end of the separator-drum, a screen arranged in said branch pipe, and air-blast tubes leading from the fan to the double perforated air-discharge tubes beneath said drum, substantially as described.

4. In a machine of the character described, the combination with a threshing mechanism, of a separating-drum having open-work sides, a revoluble shaft arranged in said drum, a series of curved feeding and beating arms projecting from said shaft, grain-tables arranged below said threshing mechanism and the separating-cylinder, an endless slatted conveyer adapted to remove the grain from said tables, a grain-shoe to receive the grain from said tables, a grain-conveyer and a tailings-conveyer arranged on said shoe, a perforated air-discharge cylinder arranged in front of said grain-shoe to discharge a blast of air over the same, a pneumatic stacker-tube arranged at the discharge end of the drum, a grain elevator and weigher arranged on the machine, a revolubly-mounted fan-shaft, a series of fans arranged on said shaft, casings arranged on said fans, air-blast tubes connecting said fan-casings with the stacker-tube and with the various parts of the separating mechanism whereby blasts of air will be discharged upon the same, substantially as described.

5. In a machine of the character described, the combination with a threshing mechanism, of a separating-drum having open-work sides, a revoluble shaft arranged in said drum, feeding and beating arms projecting from said shaft, a series of radially-disposed segmental blades arranged around said shaft between said feeding and beating arms to form stops, and a pneumatic stacker-tube arranged on the machine and in communication with the discharge end of the drum, substantially as described.

In testimony whereof we have hereunto set our hands in presence of two subscribing witnesses.

THOMAS W. SLUTZ.
KNUTE O. LEE.

Witnesses:
EMMA WETTER,
MARGARET LAWRENCE.